US008585152B2

(12) United States Patent
McCauley et al.

(10) Patent No.: US 8,585,152 B2
(45) Date of Patent: Nov. 19, 2013

(54) LOCKING MEMBER FOR A PORTABLE BELT

(71) Applicants: Blake J. McCauley, Garden City, NY (US); Charles H. Bedell, Center Moriches, NY (US)

(72) Inventors: Blake J. McCauley, Garden City, NY (US); Charles H. Bedell, Center Moriches, NY (US)

(*) Notice: Subject to any disclaimer, the term of this patent is extended or adjusted under 35 U.S.C. 154(b) by 0 days.

(21) Appl. No.: 13/710,035

(22) Filed: Dec. 10, 2012

(65) Prior Publication Data

US 2013/0097825 A1    Apr. 25, 2013

Related U.S. Application Data

(62) Division of application No. 12/683,038, filed on Jan. 6, 2010, now Pat. No. 8,371,656.

(51) Int. Cl.
*B60R 22/00* (2006.01)

(52) U.S. Cl.
USPC .......................... 297/485; 297/468; 297/464

(58) Field of Classification Search
USPC ..................... 297/485, 464, 468; 280/801.1
See application file for complete search history.

(56) References Cited

U.S. PATENT DOCUMENTS

| 4,706,992 A * | 11/1987 | Downing et al. ........... 280/801.1 |
| 5,669,671 A * | 9/1997 | Laco .............................. 297/485 |
| 6,033,029 A * | 3/2000 | Henshall ....................... 297/468 |
| 6,418,594 B1 * | 7/2002 | Miller ............................. 24/298 |
| 7,591,510 B1 * | 9/2009 | Giampavolo ............ 297/256.17 |

* cited by examiner

*Primary Examiner* — David Dunn
*Assistant Examiner* — Erika Garrett
(74) *Attorney, Agent, or Firm* — Tarter, Krinsky & Drogin LLP

(57) ABSTRACT

A portable safety belt for use on a motor coach passenger seat is provided. The portable safety belt is formed of a single strap routed to form a closed loop for encircling a seatback and an open loop terminating at either end of the strap with a male and female buckle. The open loop is adapted as a lap belt for holding a passenger. A locking member disposed at a side of the closed loop provides interrelated adjustment of the open and closed loops to tighten the closed loop around the seatback.

15 Claims, 9 Drawing Sheets

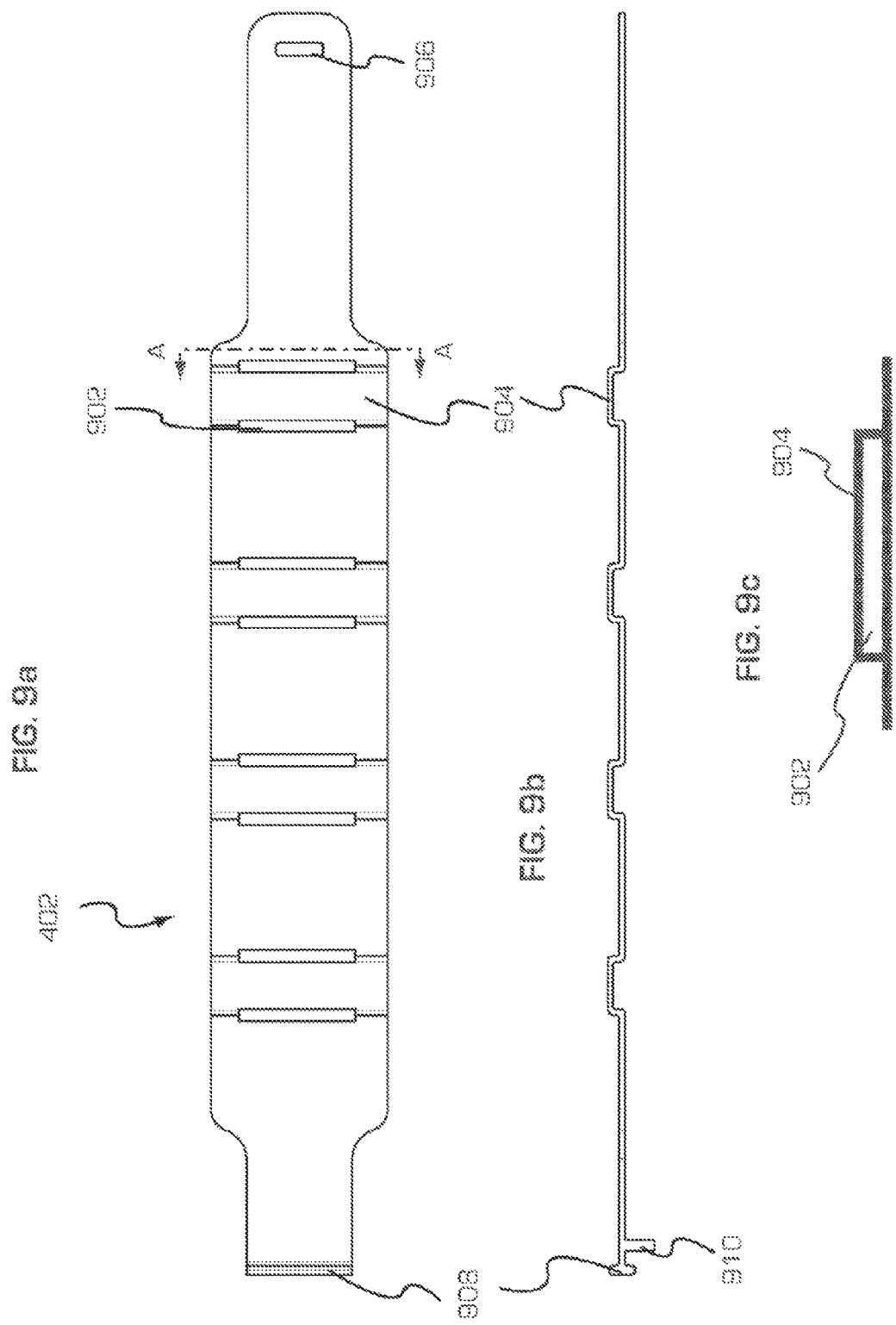

LOCKING MEMBER FOR A PORTABLE BELT

CROSS-REFERENCE TO RELATED APPLICATIONS

This application is a divisional of and claims priority from U.S. patent application Ser. No. 12/683,038 filed Jan. 6, 2010, which relates to and claims the benefit of U.S. Provisional Patent Application Ser. No. 61/204,391 filed on Jan. 6, 2009, the entire disclosures of which are hereby incorporated herein by reference.

FIELD OF THE INVENTION

The present invention relates generally to motor vehicle safety equipment, and more particularly to a portable safety belt for motor coaches and like vehicles.

BACKGROUND OF THE DISCLOSURE

While passenger vehicles are required by federal law to have seat belts, most motor coaches and other mass transportation vehicles are not generally required to have seat belts. However, because of the high center of gravity motor coaches are prone to flipping over. Therefore, providing a passenger with a portable safety belt that is easy to use can help reduce injuries resulting from vehicle rollover and collisions.

SUMMARY OF THE DISCLOSURE

A portable safety belt of the present invention includes a single strap routed to form an adjustable closed loop and an adjustable open loop having a buckle portion at each end of the strap; a reinforcing member disposed at a position along the closed loop; and a locking member disposed at a position along the closed loop opposite the stiffening member, the locking member providing interrelated, lockable size adjustment between the closed loop and the open loop.

The locking member of the present invention includes a clamping section adapted to couple with a receiving section at a coupling end, the clamping section having a portion of the open loop passing therethrough, and the receiving section having a portion of the closed loop passing in through a first opening disposed at an end of the receiving section opposite the coupling end and out through a second opening formed on a side of the receiving end at a predetermined distance from the first opening.

A method for fabricating a portable belt of the present invention includes the steps of anchoring a first end of a strap to a female piece of a two-piece buckle; looping a first portion of the strap around a first post of a tri-glide; returning a second portion of the strap from the first post along a path of the strap between the first end and the tri-glide; inserting a reinforcing member between the first and second portions of the strap; joining together the first and second portions of the strap, the reinforcing member being encased therebetween; passing a third portion of the strap through a first opening formed on a side of a locking member and out a second opening formed at a distal end of the locking member; looping a fourth portion of the strap around a second post of the tri-glide; routing a fifth portion of the strap substantially along a path of the fourth portion; passing a sixth portion of the strap through the second opening and out through a third opening formed at a proximal end of the locking member; and anchoring a second end of the strap to a male piece of the two-piece buckle.

A locking member for a portable belt is also provided, the locking member comprising a clamping section having a clamp adapted for receiving a belt strap there between, and a receiving section, the receiving section comprising a clamping opening formed at a proximal end of the receiving section and dimensioned for receiving the clamp, a side opening formed on a top surface of the receiving section, a distal opening formed at a distal end of the receiving section, and a connecting passage formed at an interior of the receiving section, the connecting passage connecting the distal opening, the side opening and the clamping opening.

The clamping section can include a pair of tabs disposed at opposing ends of the clamping section. The receiving section can include holding members disposed at opposing ends of the receiving section, the holding members being dimensioned and aligned to holdingly couple with the pair of tabs.

The locking member can include a protective cover portion disposed between each of the holding members and a side main body of the receiving section, the protective cover preventing accidental disengagement of the clamping section from the receiving section. The protective cover portion can include a recess formed at a lower side surface of the protective cover portion. The locking member can include a key having a main shaft, and a plurality of insertion members formed at a right angle to the main shaft and disposed at either end of the main shaft, the insertion members being dimensioned and adapted for insertion into the recess for compressing the tabs sufficiently to disengage the clamping section from the receiving section.

The clamping opening can include angled internal sides for exerting compressive force on the clamp when the clamping section is coupled to the receiving section. The clamp can include longitudinally disposed smooth faced teeth for frictional engagement with the belt strap. The clamping section can include finger grip contours on sides of the clamp section.

The locking member can include a holding post on the receiving section configured to hold an end of an anti-twist member for the belt strap. The holding post can be on a side opposite the side opening on the receiving section.

The distance between the distal opening and the side opening can be approximately 3 inches. One portion of the belt strap can enter the side opening and exit the distal opening of the receiving section, and a second portion of the belt strap can enter the distal opening and exit the clamping opening. The second portion of the belt strap can enter the clamp of the clamping section after exiting the clamping opening of the receiving section.

BRIEF DESCRIPTION OF THE DRAWINGS

These and other features, aspects, and advantages of the present invention will become better understood with regard to the following description, appended claims, and accompanying drawings wherein:

FIGS. 9a and 9b illustrate a rear-view and top-view, respectively, of an anti-twist member in accordance with an embodiment of the present invention, and FIG. 9c illustrates a view taken along line A-A in FIG. 9a, showing formation of a slit formed by raised area 904 through which the strap is routed.

Figure 1:
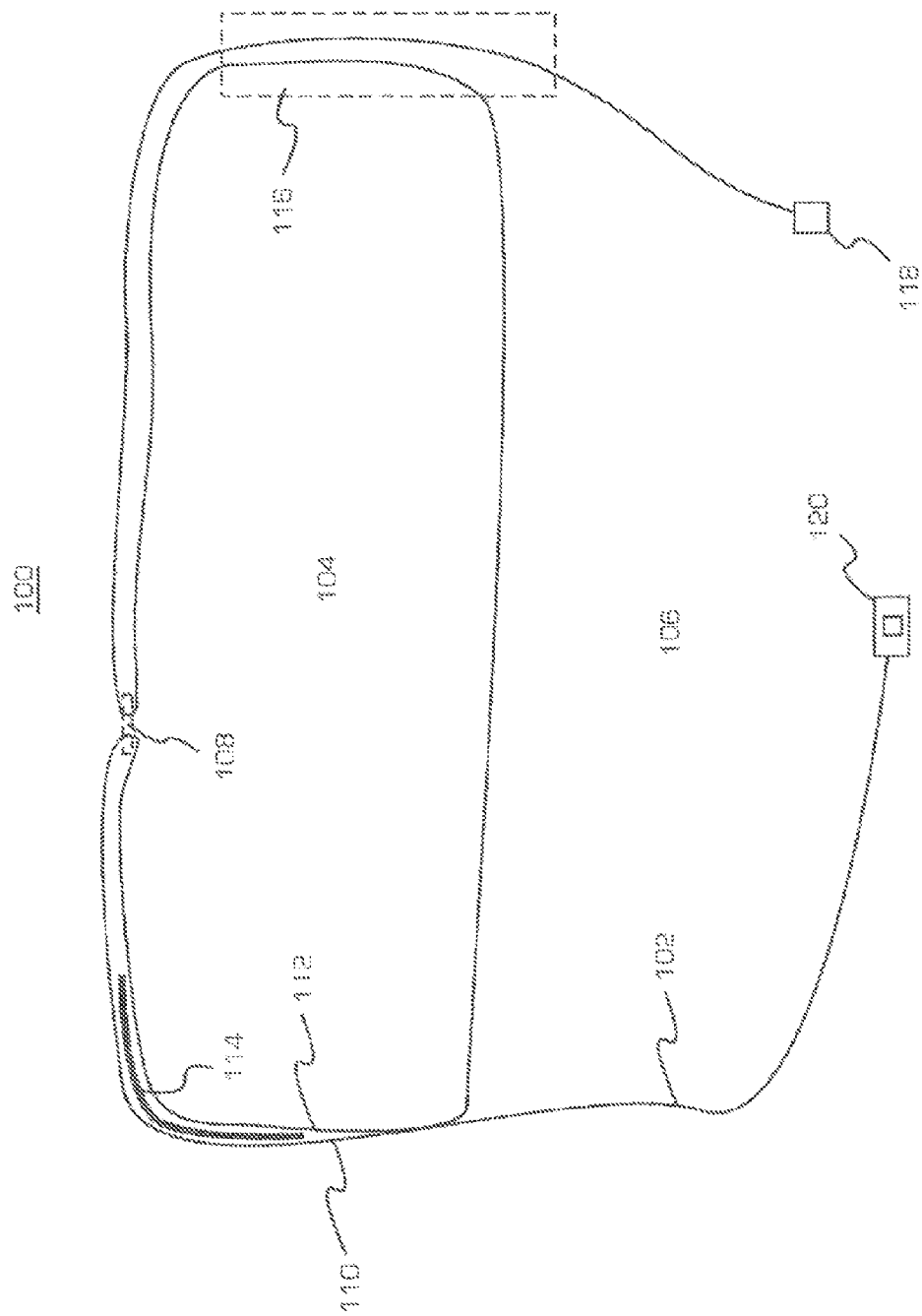
FIG. 1 illustrates a routing of a strap for forming an embodiment of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF DISCLOSURE

In the following description, identical structures are referenced with identical reference numerals.

Overview

The safety belt of the present invention is described herein below with reference to FIGS. 1-4. The portable safety belt 100 of the present invention is a single strap 102 that is formed into a closed loop 104 to fit the belt around the seatback, and an open loop 106 that forms the lap belt around a seated passenger. The strap 102 may be formed of any suitably strong, flexible material, such as ballistic nylon, Kevlar® or other rip resistant materials. The strap 102 forming a first part of the open loop 106 includes, at or near a first end thereof, a first buckle portion, e.g., a conventional male or female buckle with a female-type buckle 120 being shown. To form the closed loop 104 and the open loop 106, the strap 102 is routed around a first post of a tri-glide 108.

Throughout the disclosure of the present invention the element 108 is referred to as a tri-glide. However, it is understood that other types of buckles, having at least two posts, may be used, such as loops and D-rings. Consequently, element 108 is more generically a two-post bracket. Thus, unless indicated to the contrary, reference to element 108 as a "tri-glide" shall be understood to include the more generic "two-post bracket". Thus, unless indicated to the contrary, reference to element 108 as a "triglide" shall be understood to include the more generic "two-post bracket".

The returning portion, identified with reference numeral 112, of the strap is joined with the opposing portion, identified with reference numeral 110, of the strap 102. Portions 110 and 112 may be joined using stitching along the periphery. Alternatively, the joining may be accomplished using a bonding agent, or thermal bonding. An L-shaped reinforcing member 114 is sandwiched between portions 110 and 112. Thus, a length of the returning strap portion 112 joined with the opposing portion 110 of the strap 102 is commensurate with the length of reinforcing member 114. In an alternative embodiment, the reinforcing member is not sandwiched between strap portions, but maybe wholly attached to the joined strap portions 110, 112.

The reinforcing member 114 provides rigidity to the outer loop, which facilitates proper positioning of the closed loop 104 around a seatback 202 of a motor coach seat 204. In the present embodiment, the reinforcing member 114 does not need to be particularly strong, as the reinforcing member 114 is not intended to provide support during an accident. Therefore, the reinforcing member 114 can be fabricated from a wide range of rigid materials, such as plastic (e.g., polypropylene) or metal materials.

Figure 7:
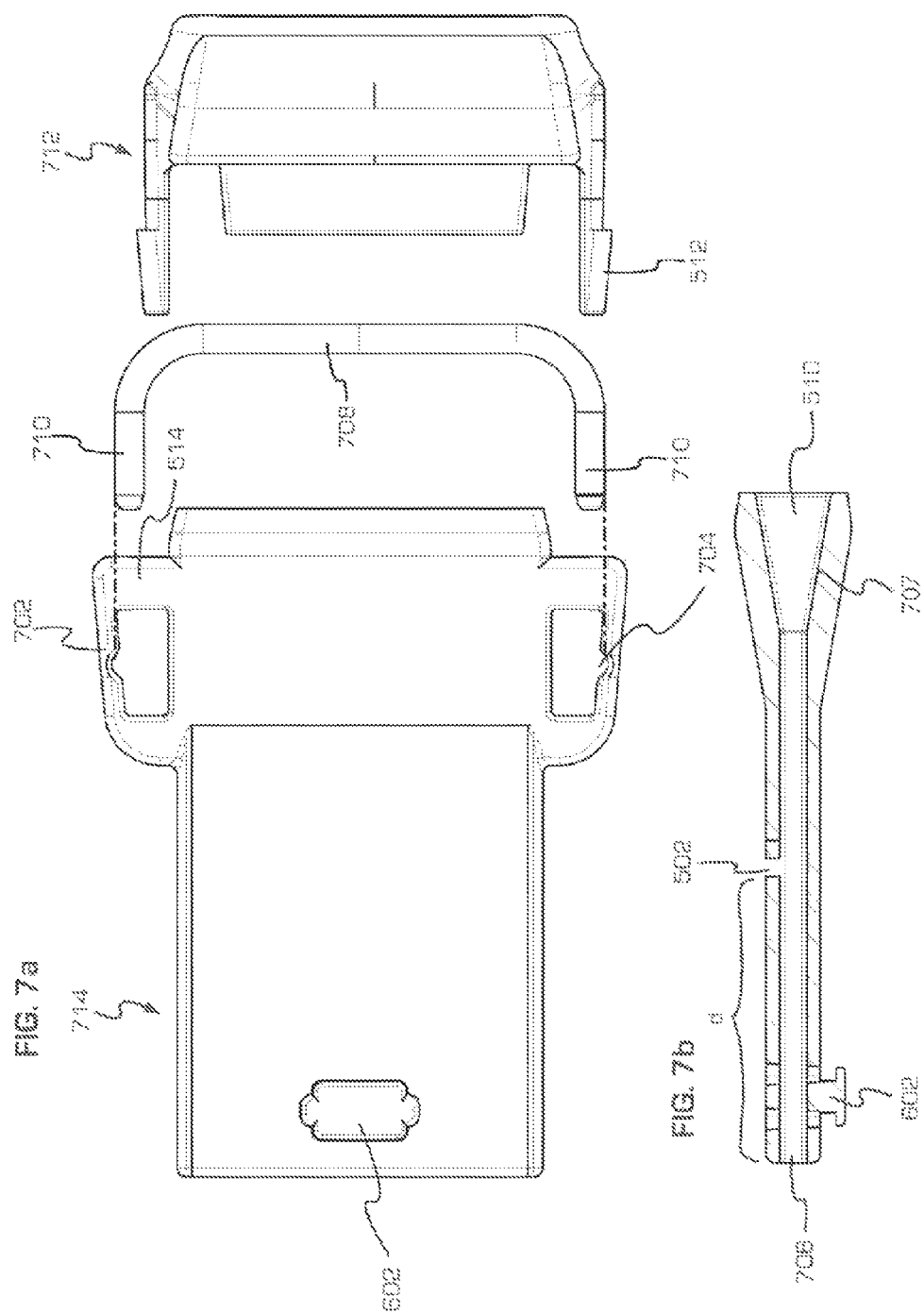
FIG. 7a illustrates a bottom-view of another embodiment of a locking member in accordance with an embodiment of the present invention.
FIG. 7b illustrates a cut-away side-view of a locking member in accordance with an embodiment of the present invention.

The strap 102 forming the closed loop portion 104 continues to a locking member 116. In one embodiment, the locking member is adapted to abut a side edge formed at or near a second corner edge 205 of the seatback 202. The strap 102 enters the locking member 116 through an opening (which may be a slot or like aperture identified with reference numeral 502 in FIG. 5) formed at a side of the locking member 116 and, in one embodiment, oriented transverse with respect the longitudinal length of the member. The strap 102 is routed from the opening through the locking member 116 in a direction toward a distal end and exits the locking member 116 through an opening at a distal end (identified as reference numeral 706 in FIG. 7b) of the locking member 116.

The strap 102, exiting the locking member 116, proceeds to, and wraps around a second post of the tri-glide 108 completing formation of the closed loop 104 of the portable safety belt. The strap portion 102 is of a length, such that, when assembled, it sufficiently extends around a substantial length of the seatback and wraps around a second post of tri-glide 108 that is positioned near a rear seatback corner edge 203. The strap 102 returns to the opening 706 at the distal end of the locking member 116 and is routed through the locking member 116 toward the proximal end, and out through an opening 510 at a proximal end of the locking member 116. The structure of the locking member 116 is discussed in detail below with reference to FIGS. 5 and 6.

The strap 102 extending beyond the proximal opening of the locking member 116 forms a second part of the open loop 106. This second part of the open loop portion extending beyond the locking member 116 of the safety belt 100 is completed with a conventional corresponding female or male buckle 118 attached to the terminal end of the strap 102. In one embodiment, the female buckle 120 attached to the initial end of the strap 102 is designed to releaseably engage the corresponding male buckle portion 118. The male buckle 118 is slideable along the length of the strap 102. However, removal of the female buckle 120 from the strap 102 is prevented.

Figure 3:
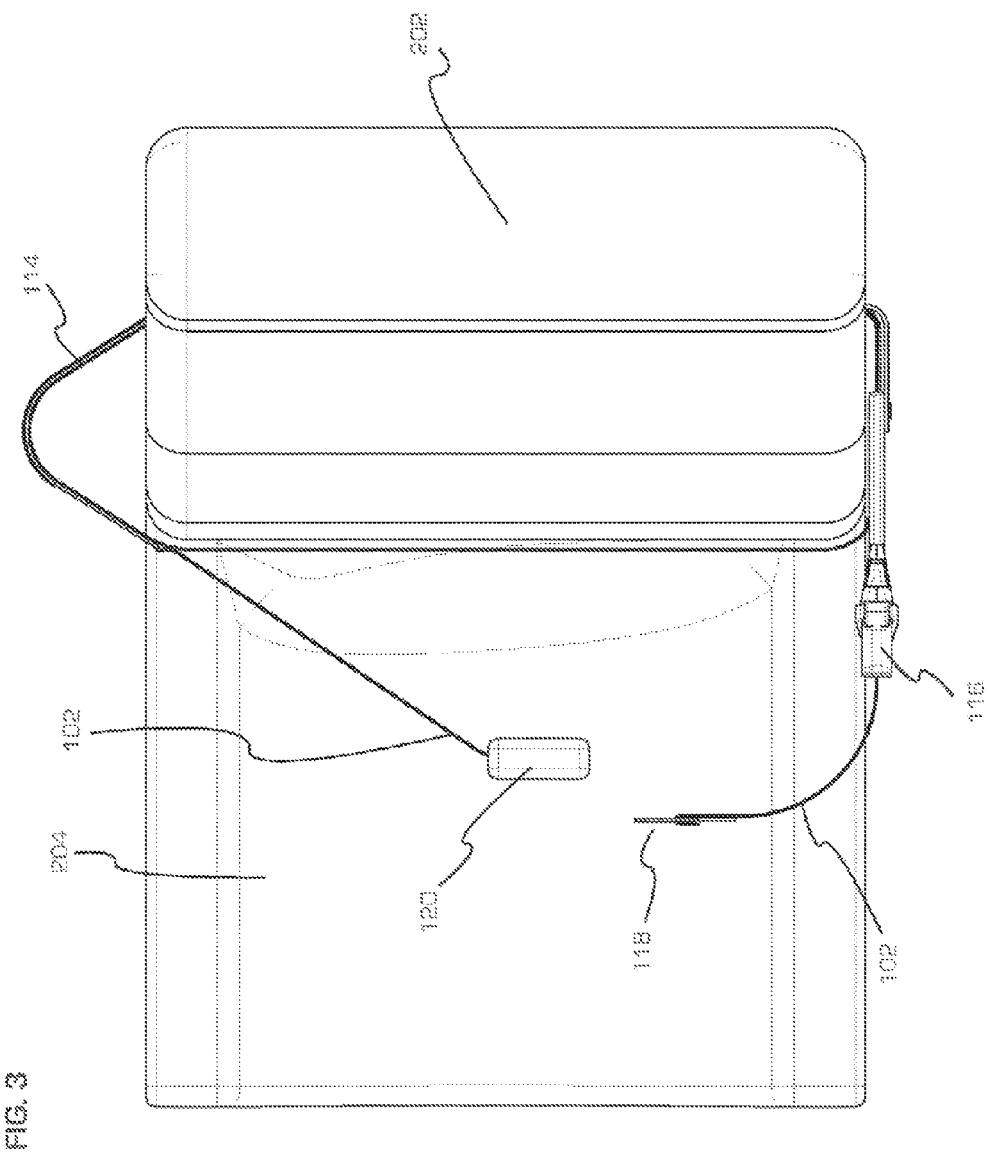
FIG. 3 illustrates a top-view of an embodiment of the present invention as positioned during use.

In view of FIG. 3, in one embodiment, a length of the initial open loop strap portion 102 between the buckle 120 and initial location of sandwiched reinforcing member 114 is approximately 10 inches. Other lengths are possible as long as it meets the objectives described herein for the seat belt. It is understood that the length of the strap used to form the portable safety belt is dependent on the dimensions of, for example, the range of seatbacks on which the portable safety belt is to be mounted and the range of passenger sizes to be accommodated. The appropriate length can be determined by one of ordinary skill in the art.

Additionally, an anti-twisting member 402 is disposed along a portion of the strap 102 that contacts the rear portion of the seatback 202. The purpose of the anti-twisting member 402 is to maintain the strap 102 in the proper unfurled orientation while the closed loop 104 is slid around the seatback 202. The structure of the anti-twist member 402 is discussed in detail below with reference to FIGS. 9a and 9b.

Figure 4:
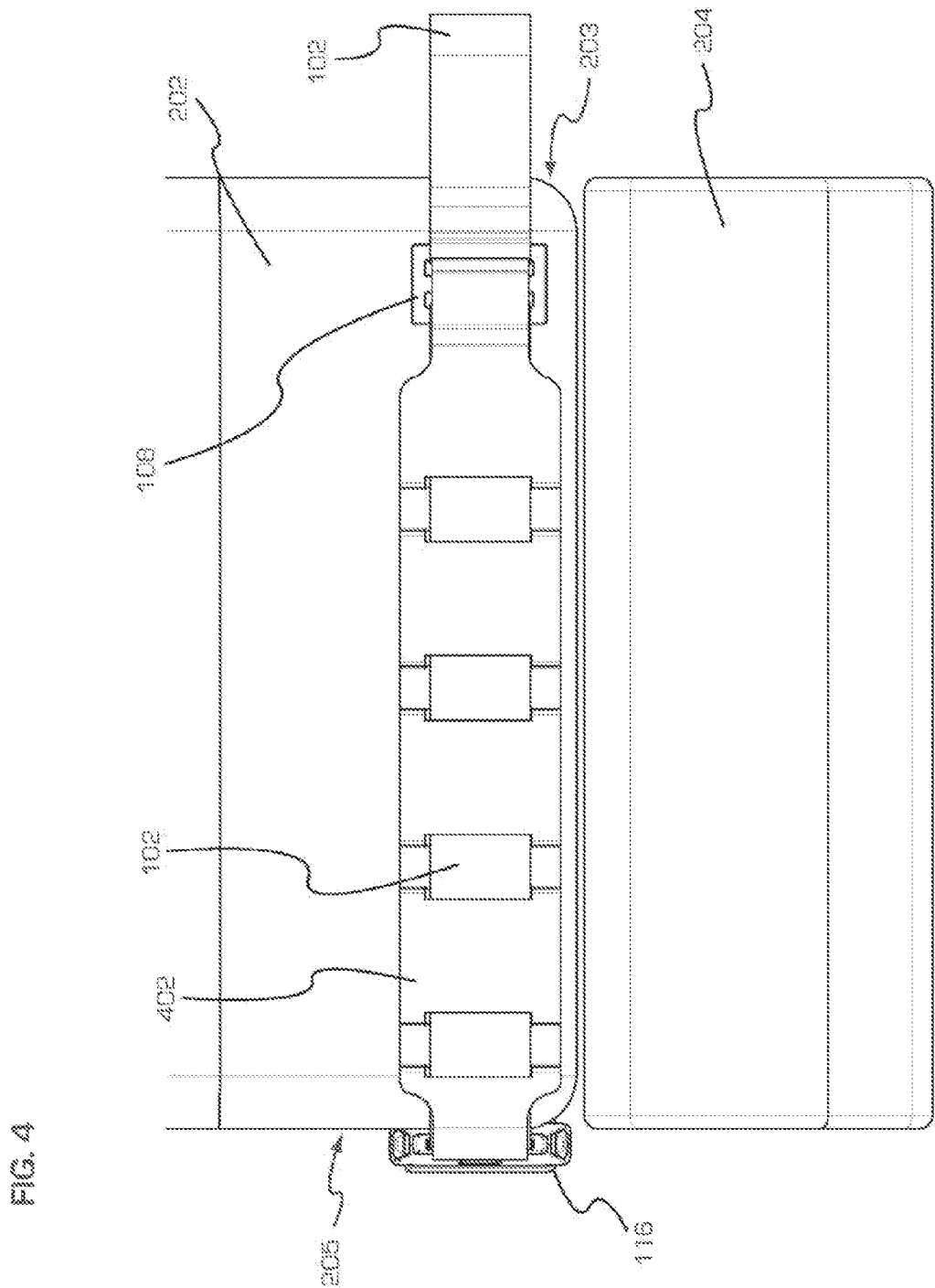
FIG. 4 illustrates a rear-view of an embodiment of the present invention as positioned during use.

The use of the portable seat belt 100 is now described in view of FIGS. 1 through 5. The closed loop portion of portable seatbelt 100 is fit around the seatback 202 of a motor coach seat 204, e.g., a single "bucket" seat. To facilitate placement of the belt 100 about the seatback 202, a user may handle the belt 100 at reinforcing member 114 on one side of the closed loop 104 and the locking member 116 at the other. A clamping section of locking member 116 at this point is not engaged so as to facilitate tightening or loosening of the closed loop 104 about the seatback 202. Generally, the section of closed loop portion 104, having flexible L-shaped reinforcing member 114 is positioned at a rear corner 203 of the seatback 202 such that flexible reinforcing member 114 naturally adjusts to the contour of seatback 202 rear and side edges such as shown in FIG. 3. The tri-glade 108 is positioned at the rear corner 203, generally behind the seatback 202 as shown in FIG. 4; however, it may be located behind the seatback 202 inward of seatback corner 203. The locking member 116, is positioned adjacent the seatback 202 at an opposite side edge of the seatback 202 just forward of the seatback 202 corner edge 205.

Figure 2:
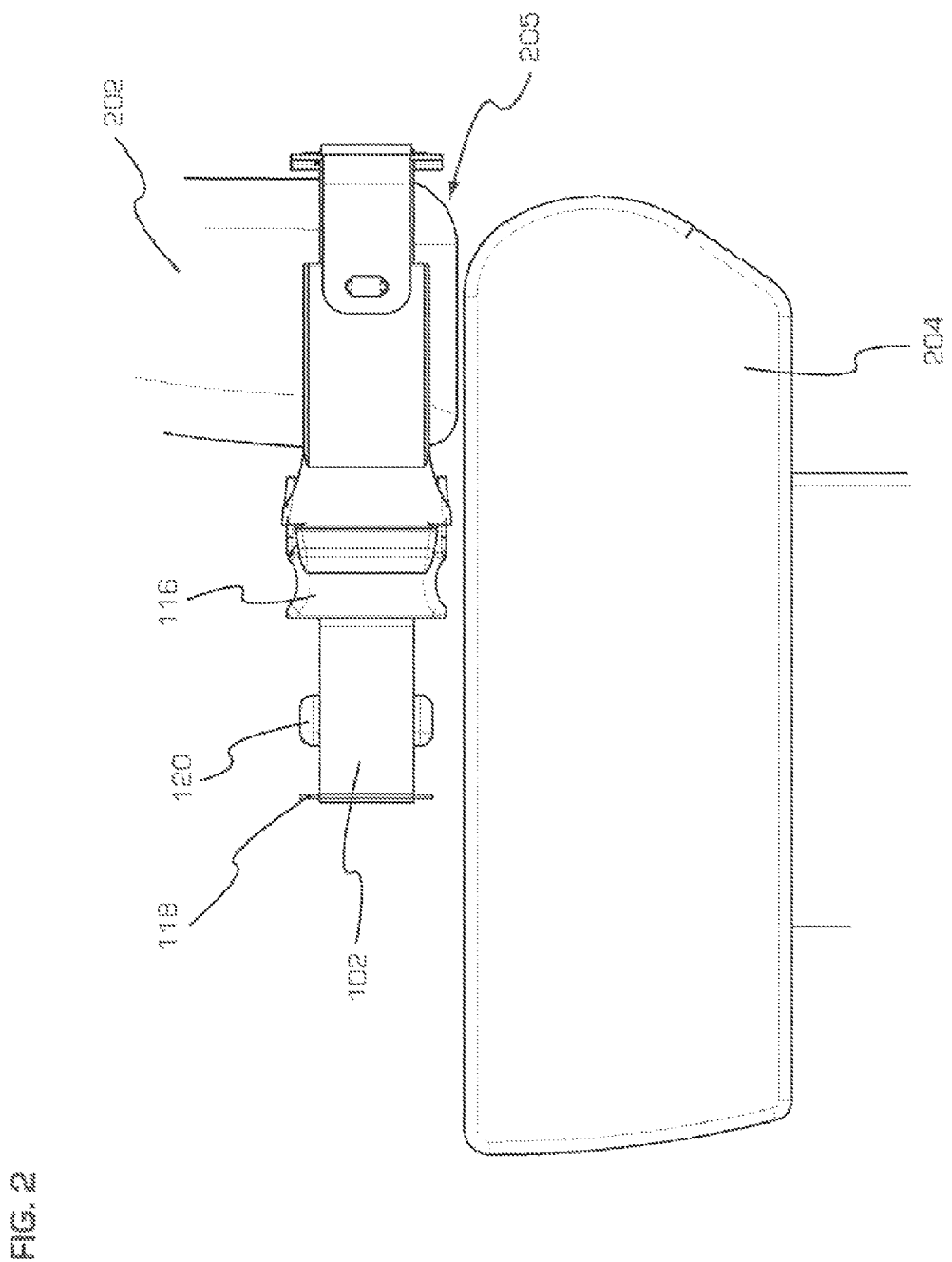
FIG. 2 illustrates a side-view of an embodiment of the present invention as positioned during use.

The closed loop portion 104 is lowered onto the seatback 202 to a desired position, and the open loop 106 portions are handled by the user to tighten or cinch the closed loop 104 about the seatback 202, such as, by pulling of each of the initial and terminal open loop 106 portions, in alternating fashion, until the belt 100 is tightly fit at a lowered position about the seatback 202. Once the closed loop belt 104 is properly positioned, as shown in FIGS. 2 and 3, the wedged shaped clamp 508 is latched into the wedged shaped locking plate 510 so that suitable engaging structures in the clamp 508 are pinched tightly to the belt 100, thereby locking the position of the belt 100.

In one embodiment, non-slip friction is applied to the belt 100 by means of smooth faced elongated teeth. Once the closed loop 104 is fixed to the seatback 202, in this position, a passenger may then be seated in the seat 204 and strapped by the seatbelt 100 by manipulating and engaging the belt buckle portions 118, 120.

In one embodiment, the locking member clamp provides enough pressure to keep the strap 102 snug to the seatback but allows the open loop portion 106 to move during a sudden stop, resulting in further tightening of the closed loop 104 to the seatback. During a collision, the single-strap design of the present invention absorbs and attenuates the forward momentum of the passenger. In such an accident, as the passenger is propelled forward, the open loop 106 that forms the lap belt around the passenger is pulled forward by the forward momentum of the passenger. Because the open loop 106 also forms the closed loop 104, slack for the forward motion of the open loop 106 is obtained by tightening the closed loop 104 around the seatback 202. As the closed loop 104 tightens further, each incremental amount of tightening requires incrementally increasing force. In this way, the forward momentum of the passenger is gradually reduced to tighten the closed loop 104. This beneficially, restrains the passenger during an accident while reducing occurrence of injuries associated with a rigidly anchored restraining system.

Locking Member

Referring to FIG. 5 through FIG. 7b, the locking member 116 is of a rigid, plastic or metal construction and includes a clamping section 504 and a receiving section 506. The clamping section 504 forms the proximal end of the locking member 116 and couples to the receiving section 506 as represented by the dotted lines shown in FIG. 5.

Figure 5:
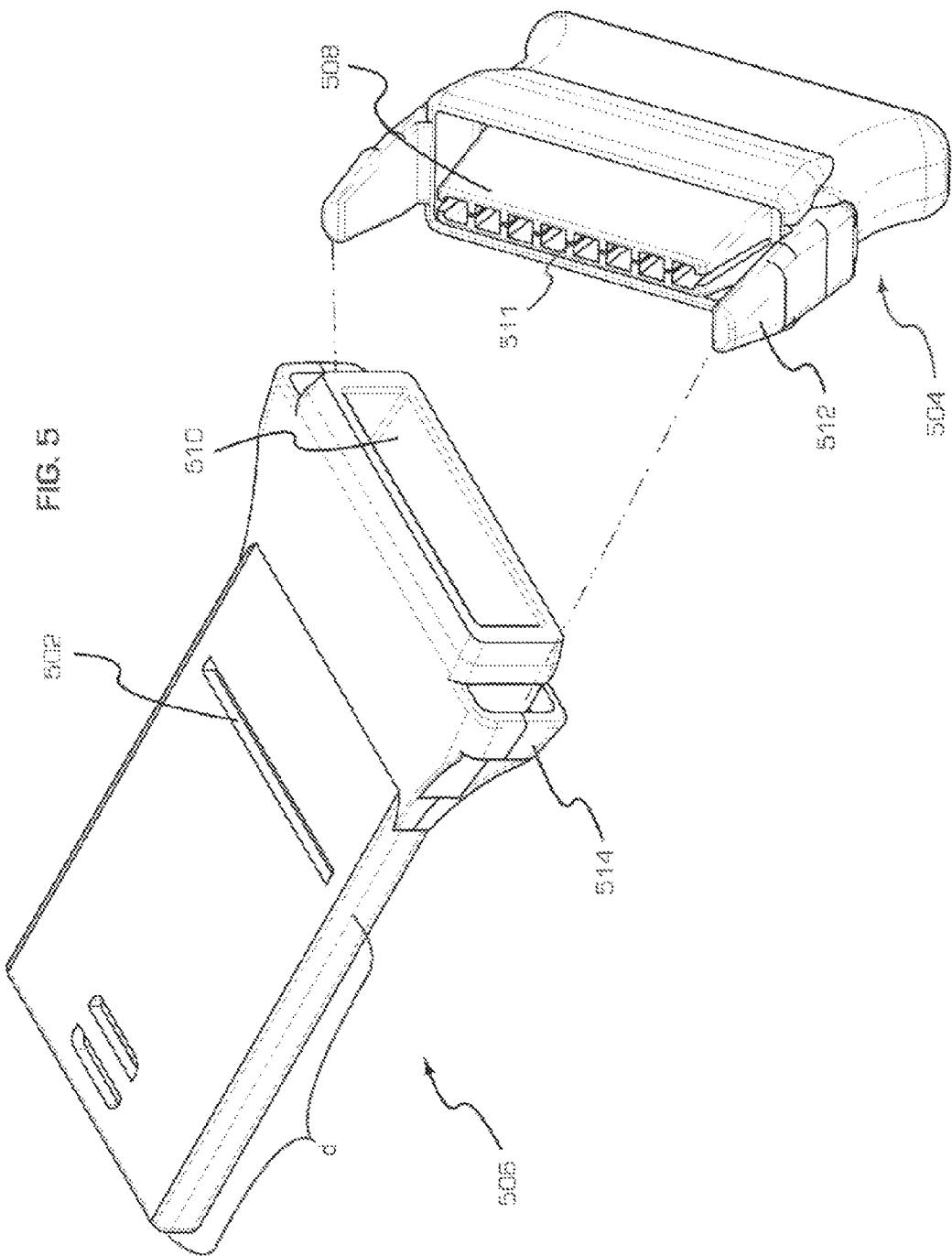
FIG. 5 illustrates a side-projection view of a locking member in accordance with an embodiment of the present invention.

As discussed above, the terminal end of the strap 102 exits through the proximal end of the locking member 116, i.e. clamping section 504. A set of clamps 508 is disposed at one side of the clamping section 504 through which terminal end of open loop strap portion 106 is routed. In one embodiment, clamp set 508 includes longitudinally disposed smooth faced teeth or similar structures 511 to facilitate frictional engagement with the portion of open loop strap portion 106 positioned between the clamps 508. As the clamping section 504 is coupled to the receiving section 506, the clamps 508 insert into a clamping opening 510, which compresses the clamps 508 urging the teeth or clamping structures 511 into pinched or tight friction engagement with the strap 102, disposed therebetween. Two tabs or catches 512 disposed on a periphery of the clamping section 504 couple with aligned holding members 514 and are configured to engage the holding members 514. As shown in FIG. 5, in one embodiment, the tabs 512 are bayonet style. To allow for easy gripping of the clamp section 504, finger grip contours 516 are formed on sides of the clamp section 504.

Figure 6:
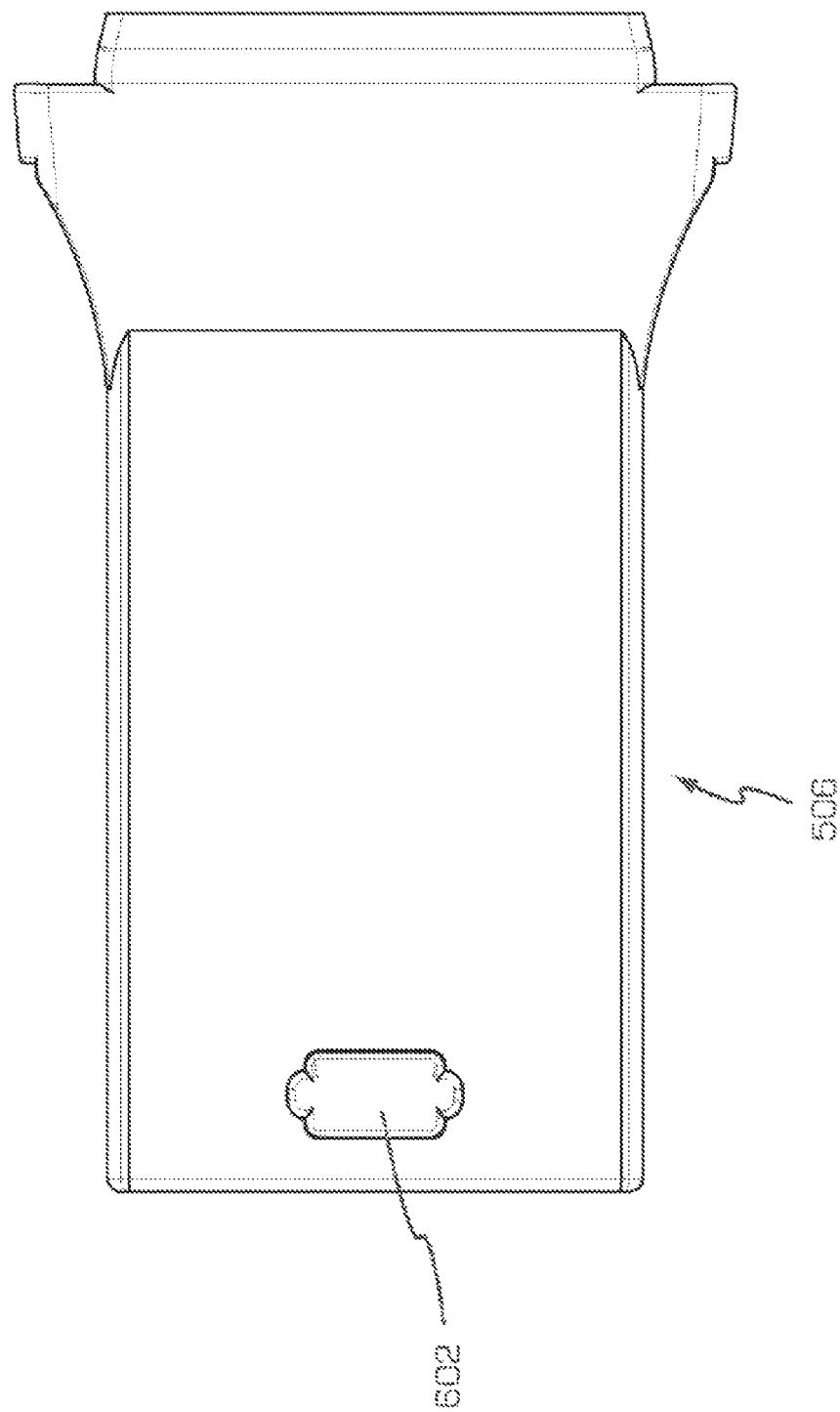
FIG. 6 illustrates a bottom-view of a locking member in accordance with an embodiment of the present invention.

Additionally, an operator of the portable safety belt can disengage the clamping section 504 from the receiving section 506 by manually compressing the tabs 512 causing the tabs to slip beneath the holding members 514. This releases the clamps 508 thereby releasing the strap 102, disposed therebetween, from engagement with the teeth or clamping structures 511. Additionally, as shown in FIG. 6, the receiving section 506 has a holding post 602, which is dimensioned for holding an end of the anti-twist member 402, described below.

In an alternative embodiment of the receiving section 714 shown in FIG. 7a, when the tabs 512 are engaged with the holding members 514, the tabs 512 are not accessible to the user. Instead, the tabs are covered by a protective cover portion 702, which extends from the holding members 514 back to the main body of the receiving section 714. The lower surface of the protective cover portion 702 has a recess 704 formed thereon. In the embodiment shown in FIG. 7a, the sides of the protective cover portion 702 are shown open, however such a structure is not necessary. Rather, the sides of the protective cover portion 702 may be open or covered without altering the function of the present invention.

Additionally, unlike the clamp section 504 in the embodiment shown in FIG. 5, the clamp section 712 of the present embodiment does not require finger grip contours since the clamp section is intended to be semi-permanently coupled to the receiving section 714. Instead, the clamp section 712 of the present embodiment can be formed as shown in FIG. 7a.

In one embodiment, a key 708 is required in order to disengage the tabs 512 from the holding members 514. The key 708 includes a main shaft terminating at either end with insertion members 710 oriented approximately 90.degree. with respect to the main shaft. When the insertion members 710 of the key 708 are aligned with, and inserted into the recess 704, a compressive force is exerted on the tabs 512, such that the tabs 512 are displaced by a sufficient distance to clear the holding members 514. Thus, allowing the clamping section 504 to be decoupled from the receiving section 506. However, without the use of the key 708, the tabs 512 cannot be compressed. Consequently, referring back to FIG. 5, the clamping section 504 cannot be accidentally decoupled from the receiving section 506.

Both embodiments of the receiving section 506, described above, have a cross-section as shown in FIG. 7b. The receiving section 506 includes angled sides 707 of the clamping opening 510. When the clamping section 504 is coupled to the receiving section 506, the clamps 508 are gradually compressed by the angled sides 707 as the clamps 508 are inserted into the clamping opening 510. The compression of the clamps 508 forms a non-slip/friction grip on the strap 102 positioned therebetween.

Additionally, as shown in FIGS. 5 and 7b, the side slot or opening 502 is on a side opposite the side on which the holding post 602 is formed, and located at a position less than 5 inches from the distal opening 706. In an exemplar embodiment, the distance between the distal opening 706 and the side opening 502 is approximately 3 inches. As shown in FIG. 7b, the distance between the distal opening 706 and the side opening 502 must be less than the thickness of the seatback 202. The distal opening 706 forms a passage connecting the side opening 502 and the clamping opening 510.

In a preferred embodiment, the side opening 502 in the locking plate is located at a distance "d" relative to the distal opening 706 to ensure strap 102 in forming the closed loop 104 is routed to align with the opening 502 at a point forward of the seatback cushion. This positioning tends to keep the locking plate from extending beyond the rear edge of the seatback cushion thereby allowing proper function.

The strap 102 enters through the transverse oriented slot or side opening 502 travels through the passage and out the distal opening 706. The section of the strap 102 returning from the tri-glide 108 re-enters the locking member 116 through the distal opening 706 and runs out the clamping opening 510. The strap 102 is positioned between the clamps 508 and exits through the opposite end of the clamping section.

Reinforcing Member

Figure 8:
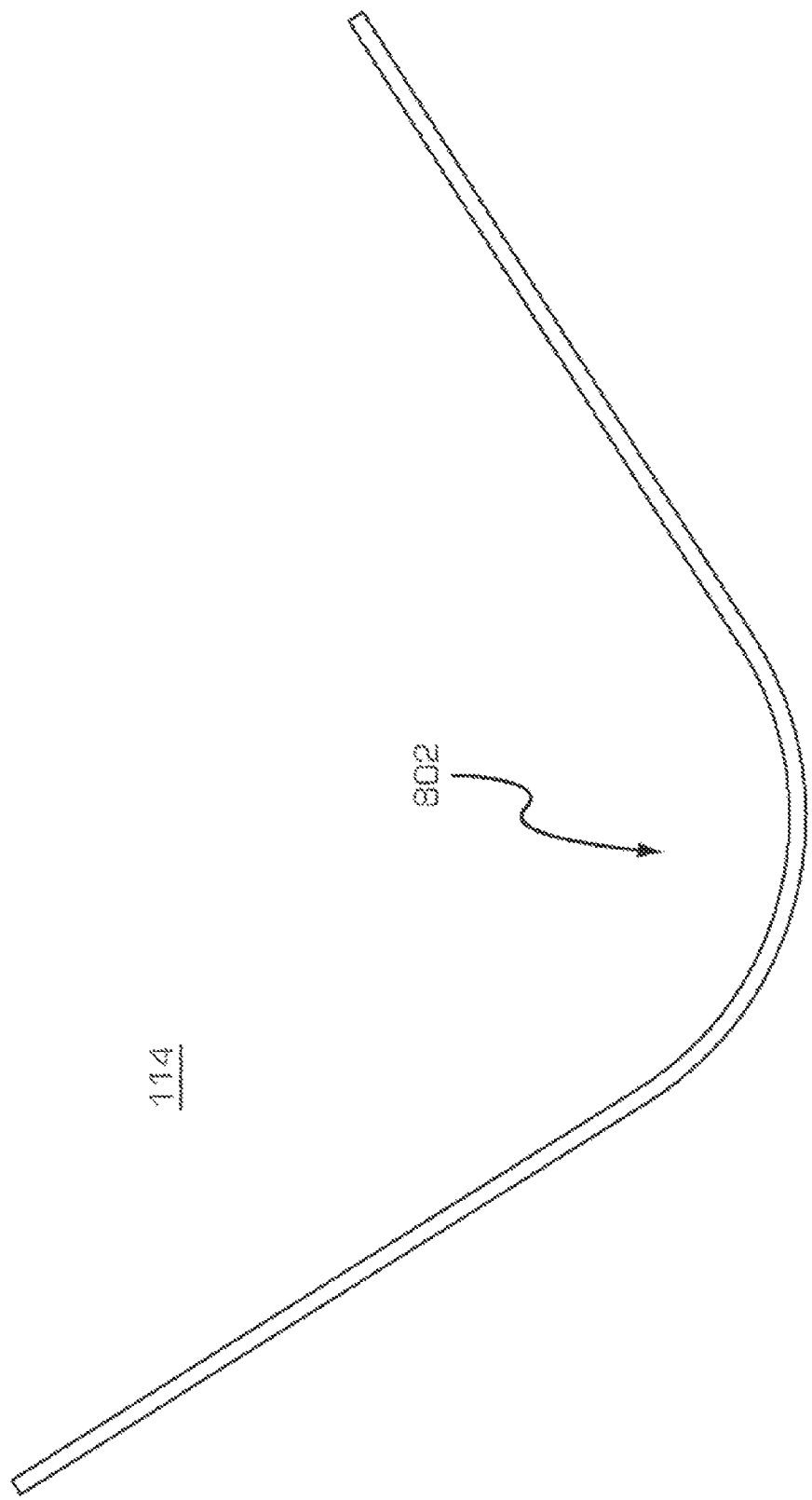
FIG. 8 illustrates a top-view of a reinforcing member in accordance with an embodiment of the present invention.

The reinforcing member 114, shown in detail in FIG. 8, is formed into an L-shape. However, other shapes for the reinforcing member 114 are possible as long as the reinforcing member 114 conforms to the shape of the seatback corner 203 and edges when the closed loop portion 104 is fitted about the seatback 202, and provides automatic positioning of the closed loop 104 on the seatback 202. Each leg of the reinforcing member 114 is dimensioned to be less than the thickness of the seatback 202. An exemplar length of each leg is approximately 5 inches. Additionally, an approximate 90.degree. angle 802, formed at the intersection of the legs, has a gradual transition formed from an arc with a radius of approximately 1.5 inches.

The reinforcing member 114 provides a handhold while applying the closed loop 104 of the safety belt 100 around the seatback 202. Additionally, the reinforcing member 114 will correctly position itself at the corner of the seatback 202 as the closed loop 104 is tightened on the seatback 202. However, the reinforcing member is not intended or required to provide a structural component during an accident. Consequently, a wide variety of materials may be appropriately used, for example plastics and metals. The materials need to be rigid and capable of maintaining the 90.degree. angle 802 when the safety belt 100 is not being used, however some flexibility is preferable so that the reinforcing member 114 can better conform to the shape of the seatback 202.

Anti-Twist Member

Referring to FIGS. 9a and 9b, the anti-twist member 402 is formed of a stiff, flexible material, such as a thick rubber or plastic strip. The anti-twist member 402 has a plurality of slits 902 grouped in pairs on either side of each of a plurality of raised areas 904. FIG. 9c is a view taken along line A_A in FIG. 9a, showing with more particularly, the formation of a slits formed by raised areas 904 through which the strap 102 is routed and prevented from unfurling. The anti-twist member 402 has a plurality of slits 902 grouped in pairs on either side of each of a plurality of raised areas 904. The strap 102 is woven in and out of the plurality of slits 902. Additionally, at one end of the anti-twist member 402 a hole is formed, which is dimensioned to slip snuggly over the holding post 602 of the locking member. The opposing end of the anti-twist member 402 has a T-structure 908 dimensioned to anchor the anti-twist member 402 to the tri-glide 108. Adjacent to the T-structure 908, a backstop 910 is formed at a distance from the T-structure substantially equal to the thickness of the tri-glide 108. The backstop 910 and the T-stop 908 prevent the anti-twist member 402 from sliding back and forth within the tri-glide 108.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method for fabricating a portable belt, the method comprising:
    anchoring a first end of a strap to a female piece of a two-piece buckle;
    looping a first portion of the strap around a first post of a two-post bracket;
    returning a second portion of the strap from the first post along a path of the strap between the first end and the two-post bracket;
    inserting a reinforcing member between the first and second portions of the strap;
    joining together the first and second portions of the strap, the reinforcing member being encased therebetween;
    passing a third portion of the strap through a first opening formed on a side of a locking member and out a second opening formed at a distal end of the locking member;
    looping a fourth portion of the strap around a second post of a two-post bracket;
    routing a fifth portion of the strap substantially along a path of the fourth portion;
    passing a sixth portion of the strap through the second opening and out through a third opening formed at a proximal end of the locking member; and
    anchoring a second end of the strap to a male piece of the two-piece buckle.

2. A locking member for a portable belt, the locking member comprising:
    a clamping section having a clamp adapted for receiving a belt strap there between; and
    a receiving section, the receiving section comprising:
        a clamping opening formed at a proximal end of the receiving section and dimensioned for receiving the clamp,
        a side opening formed on a top surface of the receiving section,
        a distal opening formed at a distal end of the receiving section, and
        a connecting passage formed at an interior of the receiving section, the connecting passage connecting the distal opening, the side opening and the clamping opening.

3. The locking member of claim 2, wherein the clamping section comprises a pair of tabs disposed at opposing ends of the clamping section.

4. The locking member of claim 3, wherein the receiving section comprises holding members disposed at opposing ends of the receiving section, the holding members being dimensioned and aligned to holdingly couple with the pair of tabs.

5. The locking member of claim 4, further comprising a protective cover portion disposed between each of the holding members and a side main body of the receiving section, the protective cover preventing accidental disengagement of the clamping section from the receiving section.

6. The locking member of claim 5, wherein the protective cover portion includes a recess formed at a lower side surface of the protective cover portion.

7. The locking member of claim 6, further comprising a key including:
- a main shaft, and
- a plurality of insertion members formed at a right angle to the main shaft and disposed at either end of the main shaft, the insertion members being dimensioned and adapted for insertion into the recess for compressing the tabs sufficiently to disengage the clamping section from the receiving section.

8. The locking member of claim 2, wherein the clamping opening has angled internal sides for exerting compressive force on the clamp when the clamping section is coupled to the receiving section.

9. The locking member of claim 2, wherein the clamp comprises longitudinally disposed smooth faced teeth for frictional engagement with the belt strap.

10. The locking member of claim 2, wherein the clamping section comprises finger grip contours on sides of the clamp section.

11. The locking member of claim 2, further comprising a holding post on the receiving section configured to hold an end of an anti-twist member for the belt strap.

12. The locking member of claim 11, wherein the holding post is on a side opposite the side opening on the receiving section.

13. The locking member of claim 2, wherein a distance between the distal opening and the side opening is approximately 3 inches.

14. The locking member of claim 2, wherein one portion of the belt strap enters the side opening and exits the distal opening, and a second portion of the belt strap enters the distal opening and exits the clamping opening.

15. The locking member of claim 14, wherein the second portion of the belt strap enters the clamp of the clamping section after exiting the clamping opening of the receiving section.

* * * * *